United States Patent [19]

Langsford

[11] 4,115,020
[45] Sep. 19, 1978

[54] CLAMP

[75] Inventor: Stephen Walter Langsford, Picnic Point, Australia

[73] Assignee: Overseas Containers Australia Pty Limited, Australia

[21] Appl. No.: 732,334

[22] Filed: Oct. 14, 1976

[30] Foreign Application Priority Data

Oct. 15, 1975 [AU] Australia .............................. PC3581

[51] Int. Cl.² .......................... B25G 3/18; A44B 21/00
[52] U.S. Cl. ................................ 403/322; 24/230 AS;
403/327; 292/49
[58] Field of Search ......... 24/205.18, 201 A, 265 CD,
24/230 AS, 211 P; 292/49, 52; 105/501, 498,
366 C; 403/327, 330, 322, 325

[56] References Cited

U.S. PATENT DOCUMENTS

| 7,240 | 4/1850 | Gray | 292/49 |
|---|---|---|---|
| 352,627 | 11/1886 | Mix | 24/230 AS |
| 780,192 | 1/1905 | Jones | 24/230 AS |
| 958,323 | 5/1910 | Schalkenbach | 292/49 |
| 1,541,185 | 6/1925 | Richardson | 292/49 |
| 1,601,359 | 9/1926 | Harrington | 24/230 AS |
| 3,066,620 | 12/1962 | Schroeder | 105/501 |

FOREIGN PATENT DOCUMENTS

| 1,632,543 | 9/1969 | Fed. Rep. of Germany | 292/49 |
|---|---|---|---|
| 565,900 | 8/1957 | Italy | 24/230 AS |

*Primary Examiner*—Bernard A. Gelak
*Attorney, Agent, or Firm*—Steinberg & Blake

[57] ABSTRACT

A clamp particularly but not exclusively suited for attaching clip-on units to cargo containers wherein the clamp takes the form of a pivotal arm or arms receivable in a slot or opening which upon subsequent pivotal movement locks the arm or arms in the opening. A preferred mode of pivoting the arm(s) is by way of a camming surface in sliding contact with the arm(s).

7 Claims, 4 Drawing Figures

CLAMP

The present invention relates to clamps and more particularly to a clamp for clamping a component to a support through a hole or opening in the support.

The present invention has a particular but not exclusive applicability for use in the attachment of ancillary units to cargo containers; such an arrangement may include a clip-on refrigeration unit for an insulated container. A clamp in accordance with the invention is operable for attachment to a hole or opening which type of openings are provided at each corner of a standard (I.S.O) cargo container so that such a container may be handled by the use of twistlocks, hooks or shackles at its corners.

In one form the present invention contemplates a clip or clamp comprising at least one arm pivotally supported on a component at a position between the ends of said arm and wherein the arm of the clamp is pivotally movable so that one end of the arm is pivotal between clamping and unclamping positions, and the one end of the arm is shaped to hold the arm in an opening in a further component when passed through said opening and pivoted to said clamping position so as to hold said components together.

In a further form the clamp comprises a single arm movable from its unclamping position to its clamping position by the sliding movement of a cam against the other end of the arm. The cam may be held in contact with the other end of the arm so that the one end is in its clamping position by the bias of torsion springs or the like.

In a still further form the present invention contemplates a clip or clamp adapted for pivotal support on a component, the clamp comprising a pair of arms having a common pivotal support wherein the arms of the clamp are connected after the fashion of pliers or reverse action pliers such that opening or closing, respectively, of the portions of the arms corresponding to handles of a pair of pliers, effects to open the opposite portions of the arms corresponding to jaws of the pliers, and wherein said opposite portions of the arms are shaped to hold the clamp in an opening when the opposite portions are passed through said opening and in an open configuration.

Another advantageous form of clamp comprises a pair of scissor-like members wherein the jaws are of bulbous shape and each has a pointed projection outwardly thereof, a cam being pivotally connected to a handle-like portion of one of the members and adapted to contact the handle-like portion of the other of said members so that sliding contact between the cam and said other member operates to open and allow closure of the handle-like portions and hence the jaws.

The invention will now be described by way of example with reference to the accompanying drawings, in which.

Figure 1:
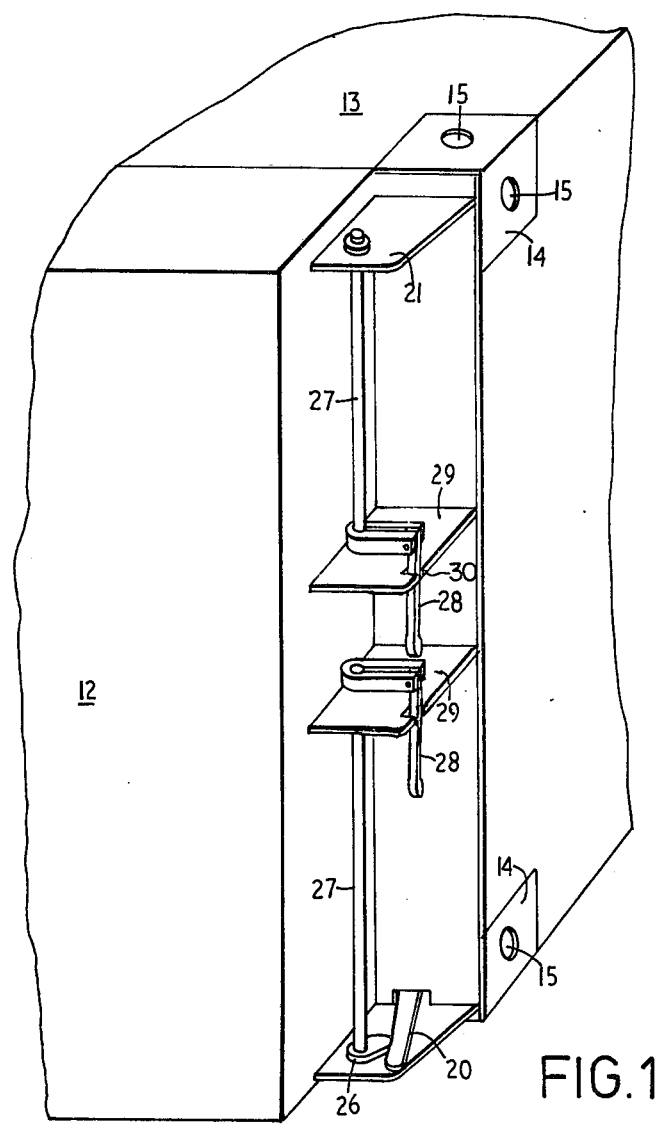
FIG. 1 is a general perspective view showing one side of a clip-on unit coupled to a container by clamps having independent operating mechanisms in accordance with the present invention.
Figure 4:
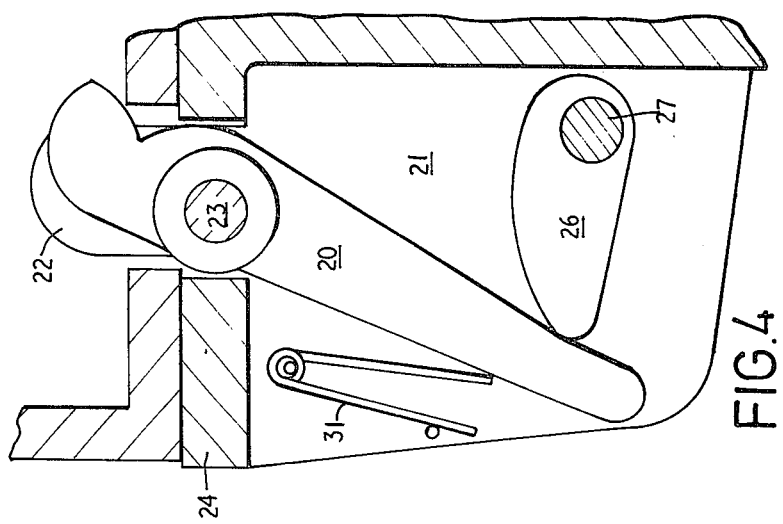
Figure 3:
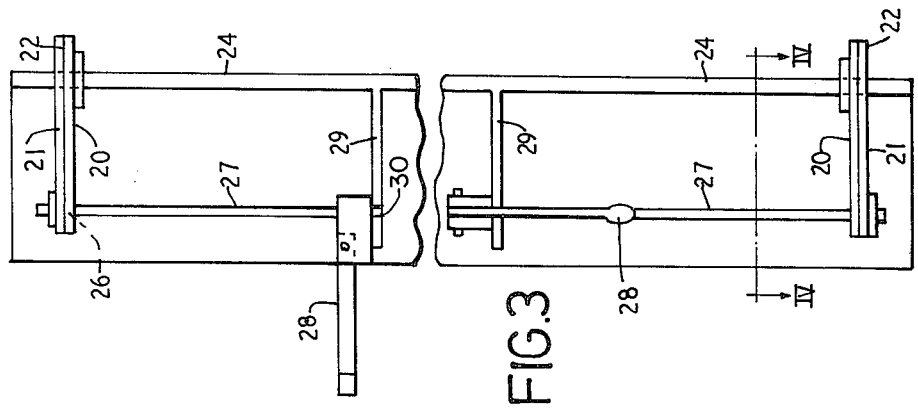
FIG. 3 is an elevational view of the clip-on unit of FIG. 1.
Figure 2:
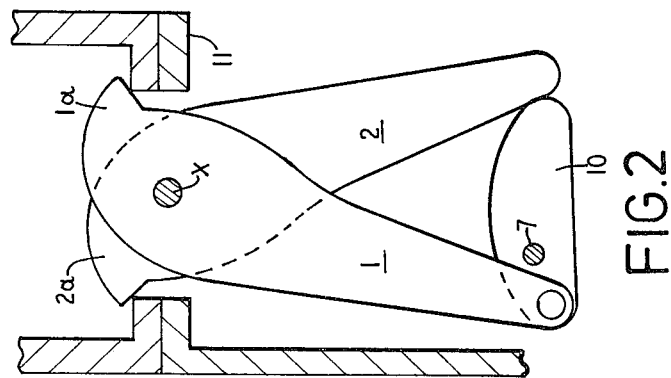
FIG. 2 is a plan view of a clamp according to a further embodiment of the present invention.

FIG. 4 is a plan view, taken along line IV—IV of FIG. 3 in the direction of the arrows, of the form of clamp employed in the arrangement of FIG. 3 and being in its clamping position Referring now to the drawings, the clamp of FIG. 2 comprises two arm members 1, 2 pivotally connected at X to the flange 11 of a frame of, say, a refrigeration unit 12 to be coupled to a cargo container 13 (see FIG. 1). The cargo container 13 as partially shown in FIG. 1 comprises corner castings 14 in the form of hollow steel boxes on each corner of the container, wherein each corner casting has three holes 15 which permit handling of the container by twistlocks, hooks, shackles or the like.

In FIG. 2 the two clamps are substantially shown as positioned at opposite ends of one side of the unit's frame. The cam 10 is pivotally connected to member 1 of each clamp so that the respective camming surfaces slide against opposing member 2 so that in the clamping position, projections 2a and 1a clamp the frame through pivot X to the corner casting.

The locking mechanism which can be seem from FIGS. 1 and 3 is effective to rapidly operate the two clamps between an open and a clamped position and back to the open position. Operation of this mechanism is as follows:

Referring to the arrangement of FIGS. 1 and 3, there is shown a pair of clamps, each having an arm member 20 and a plate 21 comprising a locating tongue 22 and forming a support means for positioning and locating each clamp arm 20 in its appropriate relation to an opening so that clamping may be effected (see FIG. 3). Each member 20 is pivotally connected by a pin 23 to a flange 24 of a clip-on unit which includes support means 21. Cam members 26 connected to respective torsion spring means in the form of torsion rods 27 are rotatable by rotating rods 27 to move members 20 into their locking or clamping positions (FIG. 4).

In the FIG. 3 arrangement each of the clamps is operated independently by a handle 28. As shown, the torsion rod 27 and its associated cam 26 are rotated by moving handle 28 in a horizontal plane. The rod 27 passing through a hole in a latching plate 29, which plate is fixed to flange 24 and also comprises a slot 30 (FIG. 1) adapted to receive handle 28 when folded as shown in the lower clamp arrangement of FIG. 3. Thus, the latching plate 29 cooperates with the handle 28 to form a means releasably holding the torsion spring means 27 in its tensioned position maintaining the clamp arm 20 in its locking position. The slot may be provided with suitable means to positively hold the handle in the locked or folded down position. This may be achieved, for example, by providing a suitable protrusion at the entrance to the slot against which the handle may rest in the folded down position.

The clamp of FIG. 4 further comprises a spring 31 which is loaded by movement of arm member 20 when cam 26 moves it to the clamping position as shown. The bias of spring 31 acts to move the arm 20 and unlock the clamp when the cam releases the arm so that the clamp is retained in its non clamping position unless under the positive action of the cam 26.

It will be appreciated that the foregoing embodiments concern preferred forms of the invention and are not to be constructed as limiting upon the broadest aspects of this invention.

What I claim is:

1. A clamping arrangement comprising support means, at least one elongated clamping arm pivoted intermediate its opposed ends to said support means for turning movement with respect thereto between clamping and unclamping positions, said arm having on one side of its pivotal connection to said support means a clamping portion and on the other side of its pivotal connection to said support means an elongated operating portion, torsion spring means pivotally connected to said support means and spaced from said operating portion of said clamping arm, and cam means fixed to said torsion spring means to be turned thereby and engaging said operating portion of said clamping arm for turning the latter from a non-clamping to a clamping position where displacement of said clamping arm from said clamping to said non-clamping position is resisted by said torsion spring means.

2. The combination of claim 1 and wherein said cam means is in the form of a cam situated beside and in the same plane as said clamping arm while said torsion spring means is in the form of an elongated torsion rod extending perpendicularly with respect to said cam.

3. The combination of claim 2 and wherein a releasable holding means cooperates with said torsion rod for holding the latter in the position to which it is turned when said clamping arm is displaced from said non-clamping to said clamping position thereof.

4. The combination of claim 3 and wherein said releasable holding means includes a latch plate formed with a slot, and a handle swingably connected to said torsion rod for movement between an operating position extending perpendicularly with respect to said torsion rod for turning the latter and a holding position extending parallel to said torsion rod and received in said slot of said latch plate.

5. The combination of claim 1 and wherein said support means includes a plate having a locating tongue to be received in an opening of a member to which the clamping arm is to be applied.

6. The combination of claim 1 and wherein only one clamping arm cooperates with said cam means.

7. The combination of claim 1 and wherein a spring carried by said support means engages said clamping arm for urging the latter to said non-clamping position thereof.

* * * * *